(12) United States Patent
Colombo et al.

(10) Patent No.: US 8,701,724 B2
(45) Date of Patent: Apr. 22, 2014

(54) TYRE FOR A VEHICLE WHEEL INCLUDING A TREAD-BAND PATTERN

(75) Inventors: Gianfranco Colombo, Concorezzo (IT); Vito Bello, Monza (IT); Marco Verona, Cinisello Balsamo (IT)

(73) Assignee: Pirelli Pneumatici S.p.A., Milan (IT)

( * ) Notice: Subject to any disclaimer, the term of this patent is extended or adjusted under 35 U.S.C. 154(b) by 2132 days.

(21) Appl. No.: 10/533,927

(22) PCT Filed: Dec. 19, 2002

(86) PCT No.: PCT/IT02/00814
§ 371 (c)(1),
(2), (4) Date: Dec. 2, 2005

(87) PCT Pub. No.: WO2004/056588
PCT Pub. Date: Jul. 8, 2004

(65) Prior Publication Data
US 2006/0151078 A1 Jul. 13, 2006

(51) Int. Cl.
*B60C 11/11* (2006.01)
*B60C 11/12* (2006.01)

(52) U.S. Cl.
USPC ............... 152/209.2; 152/209.8; 152/209.9; 152/209.18; 152/209.28; 152/902; 152/DIG. 3

(58) Field of Classification Search
USPC ........ 152/209.2, 209.3, 209.8, 209.9, 209.18, 152/209.28, 902, 903, DIG. 3; D12/527–528, 594–597
See application file for complete search history.

(56) References Cited

U.S. PATENT DOCUMENTS

| 5,256,221 | A | * | 10/1993 | Trabandt | 152/902 |
| 5,435,364 | A | * | 7/1995 | Hasegawa et al. | 152/209.28 |
| 5,538,060 | A | * | 7/1996 | van der Meer et al. | 152/902 |
| 5,660,651 | A | * | 8/1997 | Diensthuber | 152/209.8 |

(Continued)

FOREIGN PATENT DOCUMENTS

| CN | 1094841 C | | 7/1998 |
| EP | 114594 | * | 4/1989 |

(Continued)

OTHER PUBLICATIONS

English-language Abstract of JP 05-229309.

(Continued)

*Primary Examiner* — Steven D Maki
(74) *Attorney, Agent, or Firm* — Finnegan, Henderson, Farabow, Garrett & Dunner, L.L.P.

(57) ABSTRACT

A tire for a vehicle wheel includes a tread band. The tread band includes a pattern, including at least two circumferential portions, an elongated ridge, and at least two shoulder blocks. The at least two circumferential portions are disposed in axial side-by-side relationship. At least one of the circumferential portions includes a first geometric module repeated along a circumferential extension direction of the tire. The elongated ridge is bounded by two grooves oblique to the circumferential extension direction and is divided into a plurality of intermediate blocks with respect to an axial extension direction of the tread band. The intermediate blocks are bounded by a plurality of cuts substantially transverse to the elongated ridge. The at least two shoulder blocks are associated with the elongated ridge, are circumferentially aligned along a side edge of the tread band, and are bounded by grooves oriented substantially transversely to the circumferential extension direction.

56 Claims, 6 Drawing Sheets

(56) References Cited

U.S. PATENT DOCUMENTS

| | | | |
|---|---|---|---|
| 5,702,545 A | 12/1997 | Toyoshima et al. | |
| 5,725,700 A * | 3/1998 | Ichiki | 152/209.18 |
| 5,785,780 A | 7/1998 | Ochi | |
| 6,095,215 A * | 8/2000 | Hutson et al. | 152/209.28 |
| 6,311,748 B1 * | 11/2001 | Boiocchi et al. | 152/209.2 |
| 6,341,633 B1 | 1/2002 | Adlon et al. | |
| 6,607,018 B1 * | 8/2003 | Fukunaga et al. | 152/209.8 |
| 6,619,352 B2 * | 9/2003 | Diensthuber et al. | 152/209.2 |
| 2004/0118494 A1 * | 6/2004 | Liederer | 152/209.3 |

FOREIGN PATENT DOCUMENTS

| | | | |
|---|---|---|---|
| EP | 0 669 216 A1 | | 8/1995 |
| EP | 0 688 686 A2 | | 12/1995 |
| EP | 0715 973 A2 | | 6/1996 |
| EP | 739758 | * | 10/1996 |
| EP | 775600 | * | 5/1997 |
| EP | 0 921 020 A2 | | 6/1999 |
| EP | 0 921 020 A3 | | 6/1999 |
| FR | 2 800 015 | | 4/2001 |
| JP | 56-131406 | * | 10/1981 |
| JP | 64-036505 | * | 2/1989 |
| JP | 04-317805 | * | 11/1992 |
| JP | 05-229309 | | 9/1993 |
| JP | 05-301508 | * | 11/1993 |
| JP | 06-135207 | * | 5/1994 |
| JP | 06 143935 A | | 5/1994 |
| JP | 07 132710 A | | 5/1995 |
| JP | 08-025917 | | 1/1996 |
| JP | 08-197912 | | 8/1996 |
| JP | 09-132011 | | 5/1997 |
| JP | 10-264612 | * | 10/1998 |
| JP | 2000-219011 | | 8/2000 |
| JP | 2002-019423 | | 1/2002 |
| JP | 2002-059711 | * | 2/2002 |
| WO | WO 02/068222 A1 | | 9/2002 |

OTHER PUBLICATIONS

English-language Abstract of JP 08-197912.
English-language Abstract of JP 09-132011.
English-language Abstract of JP 2000-219011.
English-language Abstract of JP 2002-019423.
Shinohara, K., "Pneumatic Tire," Patent Abstracts of Japan, JP. No. 06-143935, (May 24, 1994).
Ochi, N., "Pneumatic Tire," Patent Abstracts of Japan, JP. No. 2002-264612, (Sep. 18, 2002).
Ochi, N., "Pneumatic Tire for Winter," Patent Abstracts of Japan, JP. No. 07-132710, (May 23, 1995).
Extended European Search Report dated Jun. 16, 2010 for EP Application No. 09162560.8, which is a divisional of a European counterpart to the present application.

* cited by examiner

TYRE FOR A VEHICLE WHEEL INCLUDING A TREAD-BAND PATTERN

CROSS-REFERENCE TO RELATED APPLICATIONS

This application is a national-phase entry under 35 U.S.C. §371 from International Application No. PCT/IT2002/000817, filed Dec. 19, 2002, in the Italian Patent Office, the content of which is relied upon and incorporated herein by reference.

BACKGROUND OF THE INVENTION

1. Field of the Invention

The present invention relates to a tyre for vehicle wheels.

In more detail, the invention concerns a tyre of the winter type for high performance and ultra high performance cars, i.e. cars provided with particular performance qualities and generally having a rear-wheel drive.

2. Description of the Related Art

By winter tyre it is intended a tyre provided with a tread band suitable for running on surfaces of reduced compactness in particular snow-covered roadways.

Tyres having the above qualities are usually required to possess, together with optimal features in terms of traction power, braking and handling on a snow-covered roadway, a good behaviour on dry and wet roads and a satisfactory resistance to wear. Noiseless running also helps in elevating or worsening the qualitative evaluation of a winter tyre.

Usually, the above mentioned behavioural and operational features are determined through formation in the tread band of appropriate circumferential and transverse grooves suitably sized and oriented, which grooves give rise to creation of blocks usually aligned in rows disposed consecutively in side by side relationship and extending circumferentially of the tyre itself.

It addition, of decisive importance as regards the behavioural running features of a car on a snow-covered roadway is the presence of an appropriate lamelliform arrangement of cuts in the blocks, i.e. a thick series of narrow cuts disposed consecutively in side by side relationship in a circumferential direction and oriented substantially transversely with respect to the rolling direction. The task of these narrow cuts, which are currently referred to as sipes, is substantially that of effectively collecting and retaining the snow, since friction of snow against snow is known to be greater than rubber-on-snow friction.

In the international patent application WO 02/068222 in the name of the same Applicant it is described a winter tyre for vehicle wheels comprising a tread band provided with three circumferential grooves and a plurality of transverse grooves that together delimit four circumferential rows of blocks: two axially external shoulder rows and two central rows disposed to the sides of the equatorial plane of the tyre. The transverse grooves converge to the equatorial plane towards a predetermined tyre-rolling direction. On the tread band, each transverse groove belonging to the central rows is provided with an enlarged area in its section having an essentially circular profile, the function of which is to entrap snow. In addition, for obtaining rolling with less noise on dry roads as well, each transverse edge of the blocks comprises at least two successive curvilinear portions. These curvilinear portions are differently shaped and have opposite bends in the two portions to mitigate noise generated by the impact of the blocks when the tyre is rolling on the ground.

The Applicant has perceived the increasing requirement of ensuring more handling on snow-covered roadways to all motor-vehicles and above all to those of the above mentioned high performance type, while at the same time affording more safety and comfort on dry and wet roads.

In fact many automobile houses during their winter tests have begun to regularly carry out behavioural tests on snow, beside the traditional acceleration and braking tests.

These tests are subjective behavioural tests and consist in the tyre being run on a mixed roadway, characterised by straight stretches and bends to be taken at different speeds, as well as by uphill and downhill portions, on the basis of which a test driver gives his/her opinion on different car handling parameters.

SUMMARY OF THE INVENTION

In this connection the Applicant has found that the winter tyres of the known art have a side (lateral) grip on snow-covered roadways that is not quite satisfactory. This phenomenon, present on both the car axles, is more marked on the driving wheels and is highlighted to a greater degree on rear-wheel drive cars provided with engines of high power. In fact, to ensure high performance on dry roadways, the cars of this type usually have low-section tyres, very large and stiff, having a footprint which is narrow in the circumferential direction and elongated (i.e. wide) in the axial direction of the tyre. All these features however have the opposite effect when running on snow is concerned.

The lack of side grip adversely affects the traction power on leaving a bend, giving rise to loss of grip of the rear axle of the car.

In addition, traditional block patterns for snow result in high noise when the tyre rolls on dry and compact road surfaces, reaching peaks of high intensity at given frequencies connected with the number of blocks disposed on each circumferential row of the tread band.

The Applicant has found that these problems particularly arise on vehicles in which the geometry of the suspensions imposes rather marked camber angles, for instance included between 0°, 5' and 2°, typical of the above mentioned high performance cars. In more detail, the camber angle is the inclination of the equatorial plane of a tyre from a direction normal to the road plane. In cars with a negative camber the tyre footprint has an amplitude increasingly growing towards the axially internal edge of the tyre, contrary to what happens to tyre footprints of cars with a positive camber.

The Applicant has further noticed that known winter tyres do not ensure the same performance level on dry roads as that obtainable with tyres expressly planned for use on such types of roadway.

While trying to find a solution to the problems set out hereinabove, the Applicant has perceived that the presence of transverse cuts substantially extending over the whole axial size of the tread band creates a forced correlation between the number of blocks present in the different circumferential rows, which greatly contributes to the origin of the above described problems.

The Applicant has therefore found the possibility of achieving important improvements in tyre behaviour as regards most of the problems found in the known art and correlated with side grip, handling, traction power and braking on snow as well as in terms of noiseless running on a dry road, through accomplishment of a tread band pattern in which the number of blocks arranged in each circumferential row is not strictly conditioned by the number of blocks present in other circumferential rows, for example in the shoulder rows.

Therefore, in accordance with the present invention, it is proposed a tyre for vehicle wheels comprising a tread band having a tread band pattern defined by at least two circumferential portions disposed in axial side by side relationship, at least one of which has a first geometric module repeated many times along a circumferential-extension direction of the tyre and comprising: a land portion or elongated ridge delimited by two grooves oblique to the circumferential-extension direction and divided into a plurality of intermediate blocks with respect to an axial-extension direction of the tread band, which are bounded by a plurality of cuts substantially transverse to the elongated ridge; at least two shoulder blocks associated with the elongated ridge and circumferentially aligned along a side edge of the tread band and delimited by grooves oriented transversely to the circumferential extension of the tyre.

BRIEF DESCRIPTION OF THE DRAWINGS

Further features and advantages will become more apparent from the detailed description of a preferred but not exclusive embodiment of a tyre for vehicle wheels in accordance with the present invention.

This description will be set out hereinafter with reference to the accompanying drawings given by way of non-limiting example, in which.

DETAILED DESCRIPTION OF THE EXEMPLARY EMBODIMENTS

Referring particularly to the above drawings, generally denoted at 1 is a tread band of a tyre made in accordance with the present invention; the remaining parts of the tyre are not highlighted since they can be made in any manner convenient for a person skilled in the art.

The tread band 1 has a tread band pattern 2 defined by at least two circumferential portions 3a, 3b disposed in axial side by side relationship.

In at least one of the circumferential portions 3a, 3b, the tread band pattern is substantially defined by a first geometric module 4a repeated many times along the circumferential extension direction X of the tyre.

It is pointed out that by the term "geometric module" it is herein meant a predetermined shape that is repeated along the circumferential extension X of the tyre. Geometric figures having the same shape, although with different circumferential and/or axial sizes, are at all events ascribable to a unique geometric module. In particular, on repeating the geometric module, different circumferential sizes following each other in a predetermined sequence along the circumferential extension of the tyre can be attributed to the shape identifying the module so as to distribute the rolling noise on a wider spectrum of frequencies, according to a predetermined so-called "pitch sequence".

Advantageously, the first geometric module 4a has at least two shoulder blocks 5 that are circumferentially aligned along a side edge 6 of the tread band 2 and bounded by grooves 7 oriented transversely to the circumferential extension of the tyre.

The first geometric module 4a further has an elongated ridge 8 delimited between two oblique grooves 9 with respect to the circumferential extension direction X. The elongated ridge 8 is divided into a plurality of intermediate blocks 10 with respect to an axial extension direction Y of the tread band 1, bounded by cuts 11 substantially transverse to the elongated ridge 8.

Figure 1:
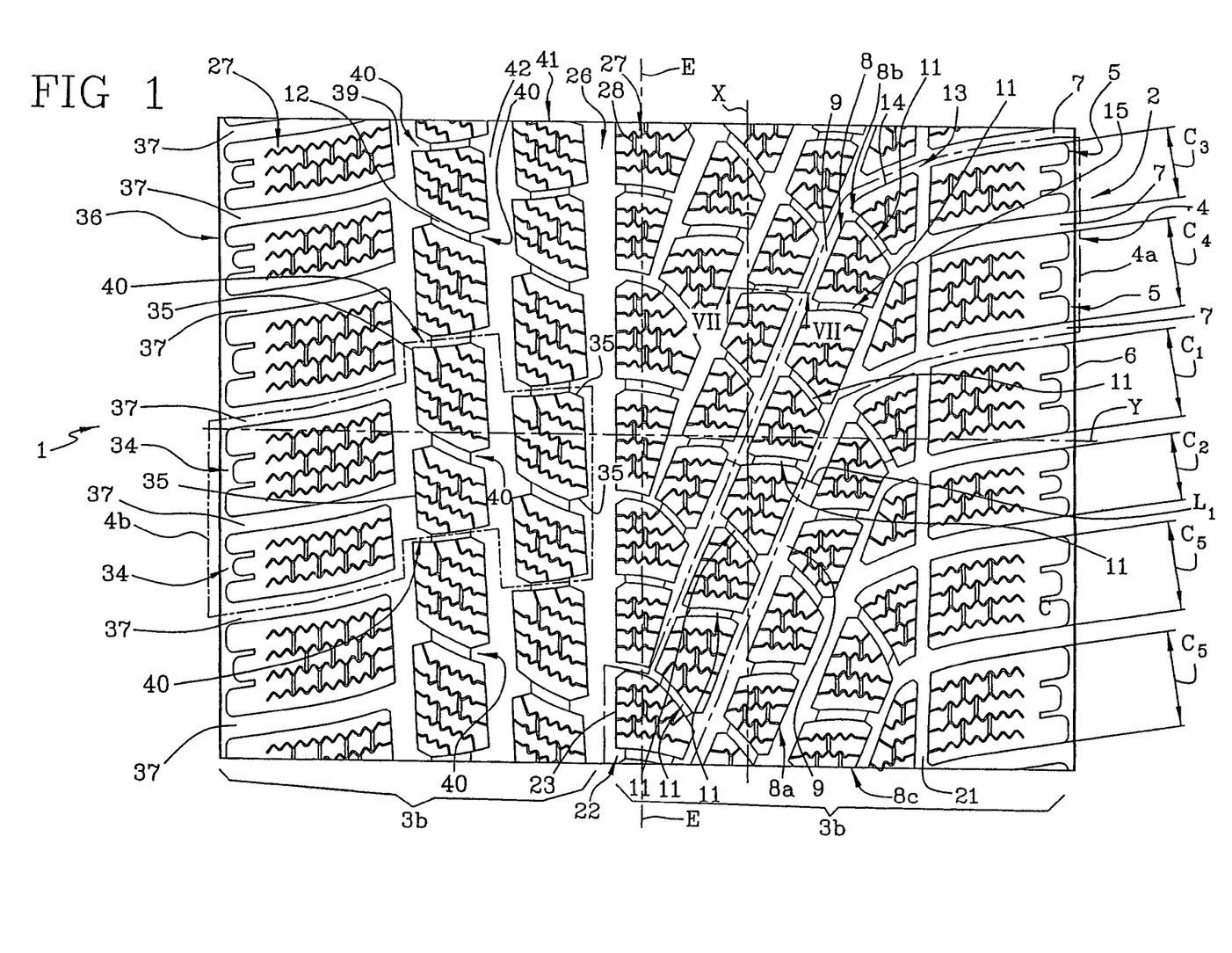
FIG. 1 is a fragmentary plan view showing a tread band of a tyre made in accordance with the present invention.
Figure 2:
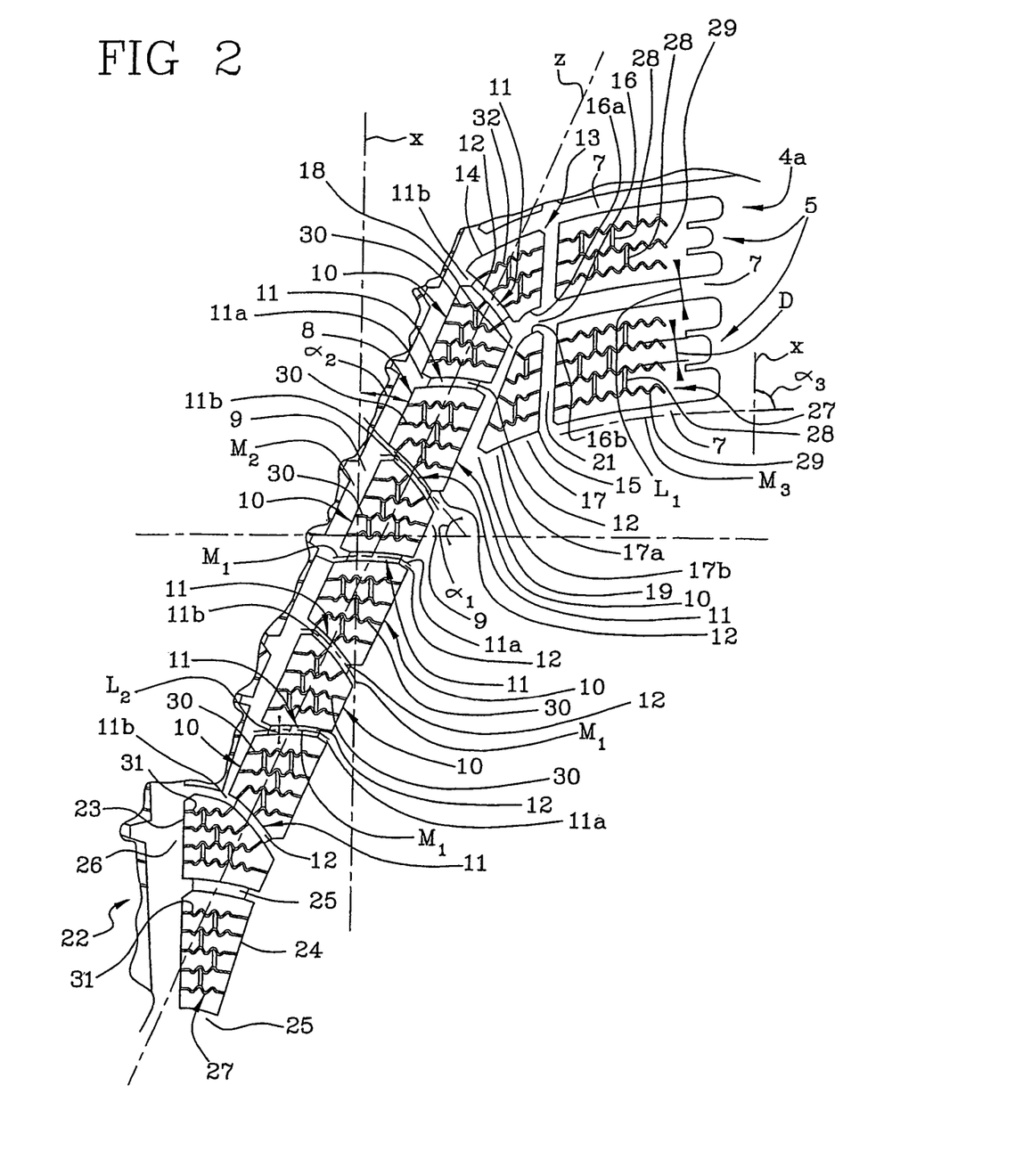
FIG. 2 shows in enlarged scale one geometric module of the tread band pattern of a first circumferential portion of the tread band shown in FIG. 1.

In the embodiment shown in FIGS. 1 and 2, six intermediate blocks 10 are provided in each elongated ridge 8. However ridges 8 with a different number of blocks 10 can be made by suitably varying the sizes of the blocks 10 themselves or the length of ridge 8 in compliance with the nominal width of the tyre.

By way of example, each transverse groove 7 and each oblique groove 9 has a depth P1 included between 6 mm and 10 mm, and a width L1 included between 4 mm and 13 mm, measured on an outer rolling surface of the tread band 1. The depth and/or width of the transverse grooves 7 can not be the same as that of the oblique grooves 9.

Cuts 11 have a depth P2 preferably smaller than that of grooves 7, 9 and included just as an indication between 2 mm and 10 mm, and a width L2 included, by way of example, between 2 mm and 10 mm, and preferably lower than that of grooves 7 and 9.

Figure 7:
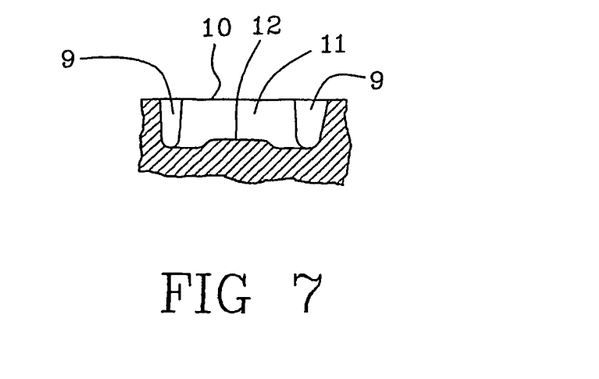
FIG. 7 shows the longitudinal-section outline of a cut sectioned along line VII-VII of FIG. 1.

In addition, to give the intermediate blocks 10 greater structural steadiness to the advantage of handling, running noiselessness and wear evenness, the blocks themselves can be connected with each other by reinforcing elements 12 placed in cuts 11. In more detail, taking into account the longitudinal section of a cut 11, as shown in FIG. 7, each reinforcing element can be defined by a portion of reduced depth arranged at the central region of the respective cut 11. The depth of cut 11 at the central region can be included, by way of example, between 1.5 mm and 9.5 mm.

In the embodiment herein illustrated, all intermediate blocks 10 are connected with each other by reinforcing elements 12 but the possibility of providing that only part of blocks 10 are connected with each other is not excluded.

Cuts 11 transverse to the elongated ridge 8 preferably comprise first cuts 11a substantially perpendicular to the circumferential extension X and second cuts 11b substantially perpendicular to the oblique grooves 9. As a matter of fact, the transverse cuts 11 have a curved shape the concavity of which is turned in the same direction. Ascribed to each of them can be a median (meridian) line $M_1$ defined as a series of points spaced apart the same distance from the respective edges of the cut.

The second cuts 11b have an inclination included between 25° and 55° with respect to the axial direction Y, wherein this inclination is represented by angle $\alpha_1$ formed between the median line $M_1$ and the axial direction Y.

Advantageously, the first cuts 11a and second cuts 11b are disposed in an alternate sequence along a major extension direction Z of the elongated ridge 8, so that each of the intermediate blocks 10 has a substantially trapezoidal shape.

Transverse cuts 11 all having the same inclination may be also provided.

The oblique grooves 9 have an inclination included between 15° and 35° relative to the circumferential direction X, wherein this inclination is represented by angle $\alpha_2$ formed between the median line $M_2$, spaced apart the same distance from the edges 9a of the oblique groove 9, and the circumferential direction X.

The transverse grooves 7 are slightly curved and have an inclination included between 75° and 105° relative to the circumferential direction X, wherein this inclination is represented by angle $\alpha_3$ formed between the median line $M_3$ as defined for the transverse cuts 11 of the elongated ridge 8, and the circumferential direction X.

In the embodiments shown the oblique grooves 9 each have an orientation concordant with the transverse grooves 7 and run in the extension of one of the transverse grooves 7 themselves.

In particular, the elongated ridge 8 has an axially external end 13 located close to the tyre shoulder and substantially in alignment, in an axial direction, with one of the shoulder blocks 5. The axially external end 13 of the elongated ridge 8 is defined by an end block 14 having a substantially trapezoidal shape.

The first geometric module 4a further comprises an auxiliary block 15 disposed circumferentially close to the axially external end 13 of the elongated ridge 8 and substantially having a trapezoidal shape.

The auxiliary block 15 is bounded by a first branch 16 and a second branch 17 of the oblique groove 9 each terminating at one of the transverse grooves 7. Preferably, both the first branches 16 and the second branches 17 are substantially aligned with one of the transverse grooves 7, and the auxiliary block 15 is substantially aligned, in an axial direction, with one of the shoulder blocks 5.

More specifically, the first branch 16 extending from an axially external end 18 of the oblique groove 9 delimits the end block 14 of the elongated ridge 8, on one side 16a, and the auxiliary block 15, on the opposite side 16b.

The second branch 17 extending from an intermediate point 19 located between the axially external end 18 and an axially internal end 20 of the oblique groove 9, delimits the auxiliary block 15, on one side 17a, and the end block 14 of the adjacent elongated ridge 8, on the opposite side 17b.

The end block 14 and auxiliary block 15 appear as appendices of the respective shoulder blocks 5 spaced apart therefrom by a circumferential shoulder groove 21 separating the elongated ridges 8 from the shoulder blocks themselves. The shoulder groove 21 has a width included, just as an indication, between 1.5 mm and 6 mm and a depth included, by way of example, between 2 mm and 10 mm, preferably smaller than that of the transverse groove 7 over at least part of the circumferential extension of each shoulder block 5. The first and second branches 16, 17 and the respective transverse grooves 7 open into the circumferential shoulder groove 21.

The elongated ridge 8 further has a swollen axially internal end 22 in which at least two centre blocks 23, 24 are defined; said blocks are circumferentially aligned and each have a substantially trapezoidal shape.

The centre blocks 23, 24 are bounded by transverse cuts 25 converging into a circumferential separating groove 26 interposed between the circumferential portions 3a, 3b of the tread band pattern.

In particular, a first centre block 23 is separated from one of the intermediate blocks 10 by one of the second transverse cuts 11b. Also associated with the first centre block 23 is a second centre block 24 separated from the first centre block 23 by one of the transverse cuts 25 converging into the circumferential separating groove 26. Finally, the first centre block 23 is also delimited by one of the second centre blocks 24 which is circumferentially consecutive by means of one of the transverse cuts 25.

Advantageously, as shown in FIGS. 1 to 4, the shoulder blocks 5 do not all have the same circumferential size C along the circumferential tyre extension. The elongated ridges 8 too have a varying transverse size depending on the size of the shoulder blocks 5 associated therewith. This is due to the fact that, as above mentioned, in repeating the geometric module along the circumferential tyre extension, the module shape is preferably proposed again in several different forms mainly differentiated from each other in the size of the circumferential extension so that at least one of the two shoulder blocks 5 associated with one of the elongated ridges 8 has different circumferential sizes C with respect to those of at least one of the two shoulder blocks 5 associated with at least one of the adjacent elongated ridges 8.

Furthermore, the two shoulder blocks 5 associated with one individual elongated ridge 8 can have the same circumferential sizes C or different circumferential sizes C.

For example, denoted at 8a in FIG. 1 is an elongated ridge the axially external end 13 of which is associated with a shoulder block 5 having a circumferential size $C_1$ greater than the circumferential size $C_2$ of the shoulder block 5 aligned with the auxiliary block 15 belonging to the same geometric module. In addition, denoted at 8b is an elongated ridge the axially external end 13 of which is associated with a shoulder block 5 having a circumferential size $C_3$ smaller than the circumferential size $C_4$ of the shoulder block 5 aligned with the corresponding auxiliary block 15.

A further elongated ridge identified with 8c is also provided in which the shoulder blocks 5 all have the same circumferential size $C_5$.

The tread band 1 also has a plurality of sipes 27 formed in the different blocks 5, 10, 15, 23 and 24 and mainly extending in an axial direction.

Advantageously, each sipe 27 may extend following a saw-toothed profile the depth of which is in the range of 1.5 mm to 9.5 mm and the width of which does not exceed 1 mm. Furthermore, sipes 27 are circumferentially spaced apart from each other by a value D included between 4 mm and 8 mm.

The tread band 1 further has a plurality of notches 28 connecting sipes 27. In particular, two adjacent sipes 27 are connected by at least one connecting notch 28 having a substantially circumferential extension with a depth in the range of 1 mm to 3 mm and a width in the range of 1 mm to 2 mm, measured in an axial direction.

The connecting notches 28 generally do not connect more than two consecutive sipes 27 and do not open into the grooves 7, 9 and the cuts 11 delimiting the blocks.

In more detail, each of the shoulder blocks 5 has a first series 29 of sipes 27 disposed according to an extension substantially parallel to the transverse grooves 7.

The intermediate blocks 10 each have a second series 30 of sipes 27 disposed parallel to each other mainly in an axially-extending direction.

The centre blocks 23, 24 each have a third series 31 of sipes 27 disposed parallel to each other mainly in an axially-extending direction.

Finally, the end blocks 14 and auxiliary blocks 15 each have a fourth series 32 of sipes 27 disposed according to an extension substantially parallel to the transverse grooves 7.

In the embodiments shown, each of the shoulder blocks 5, end blocks 14 and auxiliary blocks 15 is provided with three or four sipes 27. Each of the centre blocks 23, 24 has four or five sipes 27. The intermediate blocks 10 each have four sipes 27.

Advantageously, as shown in FIGS. 1 to 4, the tread band pattern 2 comprises a first circumferential portion 3a and a second circumferential portion 3b disposed in side by side relationship and spaced apart from each other by the circumferential separating groove 26.

Advantageously, the separating groove 26 can be spaced apart from the equatorial plane E of the tyre (FIGS. 1 and 4) towards one or the other of the tyre shoulders, by an amount for example included between 2% and 8% of the overall width of the tread band 1.

In the second circumferential portion 3b, the tread band is defined by a second geometric module 4b repeated many times along the circumferential tyre extension.

Figure 3:
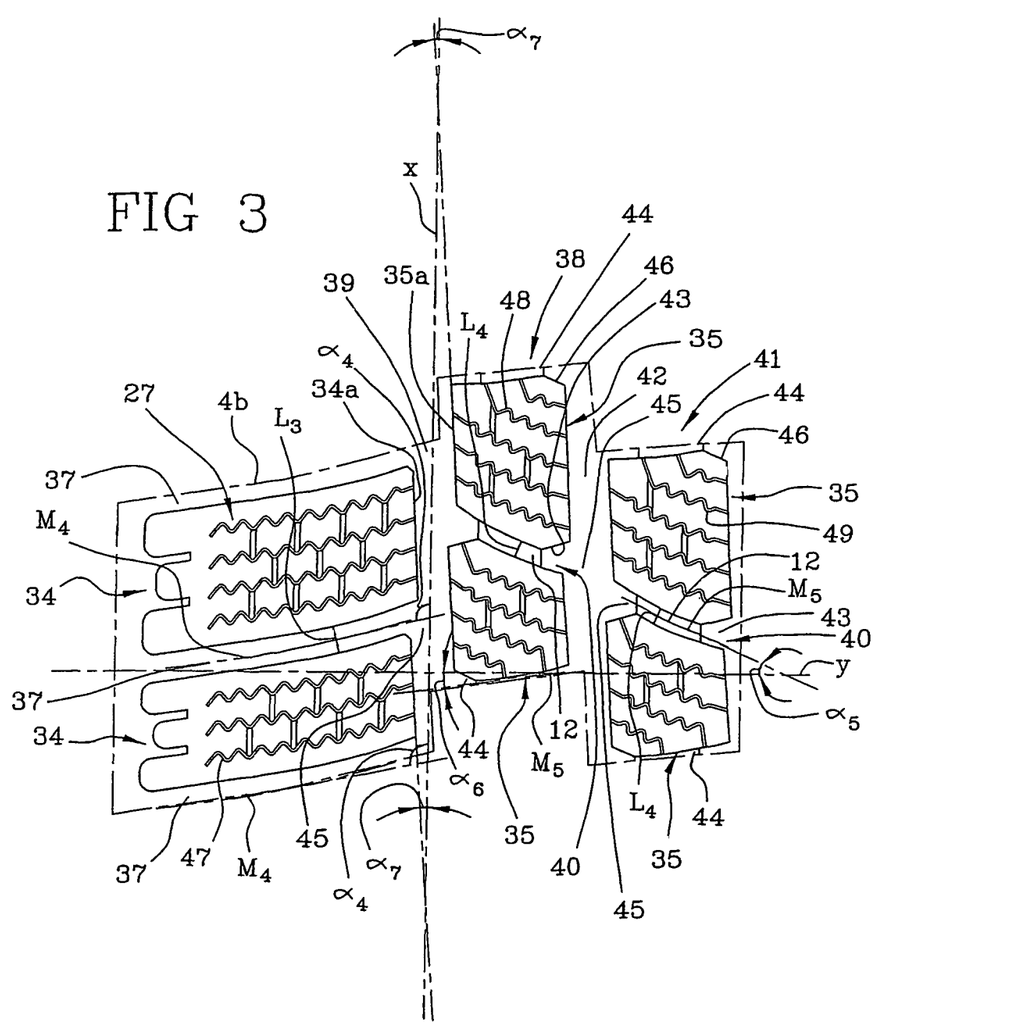
FIG. 3 shows in enlarged scale a second geometric module of the tread band pattern of a second circumferential portion of the tread band of FIG. 1.

In accordance with the embodiment shown in FIG. 1, the first circumferential portion 3a of the tread band pattern 2 has the same structure as hitherto described whereas the second geometric module 4b of the second circumferential portion 3b comprises two shoulder blocks 34 and four inner blocks 35 (FIG. 3).

Repeating the second geometric module 4b along the circumferential extension X gives origin to a plurality of shoulder blocks 34 arranged along a single row, and to a plurality of inner blocks 35.

Figure 4:
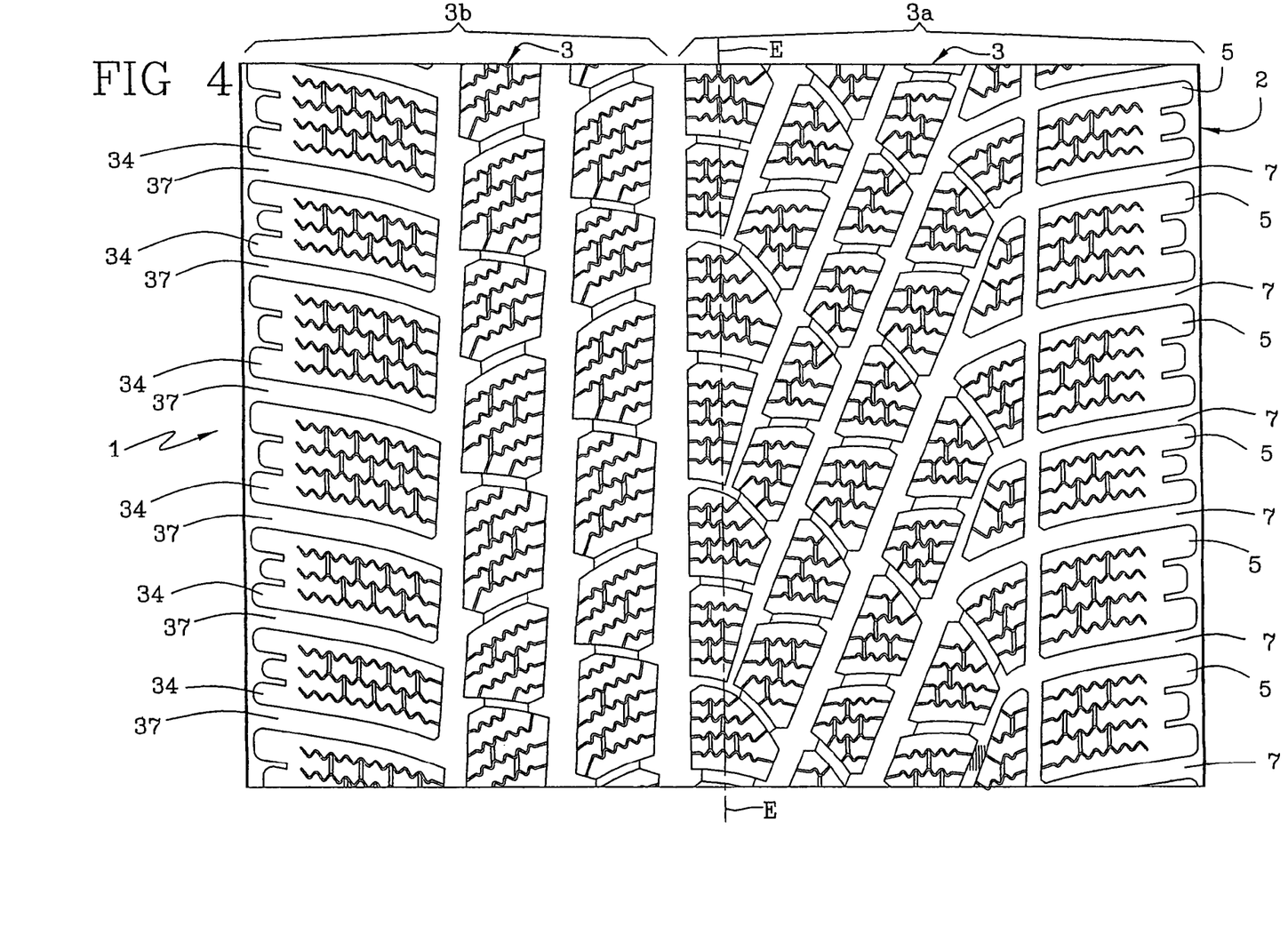
FIG. 4 shows a second embodiment of the tread band of FIG. 1.

Also the shoulder blocks 34 and inner blocks 35 of the second geometric module 4b in accordance with the embodiments shown in FIGS. 1, 3 and 4 do not all have the same circumferential size C along the tyre extension.

The shoulder blocks 34 of the second circumferential portion 3b in accordance with the preferred embodiment are circumferentially aligned along a side edge 36 of the tread band 1, axially opposite to the side edge 6 of the first circumferential portion 3a, and confined by grooves 37 oriented transversely of the circumferential tyre extension.

More specifically, the transverse grooves 37 are slightly curved and have an inclination included between 75° and 105° with respect to the circumferential direction X, wherein said inclination is represented by angle $\alpha_4$ formed between the medial line $M_4$, as defined for the transverse cuts 11 of the elongated ridge 8, and the circumferential direction X itself.

The inner blocks 35 are distributed along at least one first circumferential row 38 separated from the shoulder blocks 34 of the second circumferential portion 3b by a circumferential shoulder groove 39 and are delimited by grooves 40 oriented transversely to the circumferential tyre extension.

Preferably, the second circumferential portion 3b of the tread band pattern 2 further comprises a second circumferential row 41 of inner blocks 35 disposed in axial side by side relationship with the first row 38 and separated therefrom by a circumferential groove 42.

In further embodiments not shown, the tyre can be provided with more than two circumferential rows of inner blocks 35, for example along the nominal chord of the tyre itself.

Just as an indication, grooves 37, 39, 40, 42 of the second circumferential portion 3b and the separating groove 26 do not necessarily have the same depth P3, said depth being preferably included between 6 mm and 10 mm.

The inner blocks 35 of each row 38, 41 can advantageously be connected with each other by reinforcing elements 12 similar to the reinforcing elements 12 used for the intermediate blocks 10 of the elongated ridges 8.

In addition, the transverse grooves 37 of the shoulder blocks 34, the circumferential grooves 39, 42 and separating groove 26 do not necessarily have the same width L3, said width being preferably included between 4 mm and 13 mm, measured on an outer rolling surface of the tread band 1.

Finally, the transverse grooves 40 of the inner blocks 35 have a width L4 included between 2 mm and 10 mm, generally smaller than the width L3 typical of grooves 37 in the shoulder blocks 34, as well as of the circumferential grooves 39, 42 and separating groove 26. Advantageously, the transverse grooves 40 bounding the inner blocks 35 of the first row 38 are circumferentially offset with respect to the transverse grooves 37 of the shoulder blocks 34 of the second circumferential portion 3b and, where the second row 41 is also provided, with respect to the transverse grooves 40 bounding the inner blocks 35 of the second row 41.

Between the transverse grooves 40 delimiting the inner blocks 35 are provided first grooves 40a that are inclined to the axial direction Y and second grooves 40b substantially perpendicular to the circumferential tyre extension. The first grooves 40a and second grooves 40b are disposed in an alternate sequence along the respective circumferential row 38, 41, so as to give the inner blocks 35 a substantially trapezoidal shape.

More specifically, the transverse grooves 40 have a curved shape the concavity of which is turned in the same direction. A median line defined as the series of points spaced apart the same distance from the respective edges of the groove can be ascribed to each of said grooves.

The first grooves 40a are inclined to the axial direction Y by an angle included between 25° and 55°, wherein said inclination is represented by angle $\alpha_5$ formed between the median line $M_5$ and the axial direction Y.

The second grooves 40b too are inclined to the axial direction Y by an angle included between 5° and 20°, wherein this inclination is represented by angle $\alpha_6$ formed between the median line $M_6$ and the axial direction Y.

Preferably, the first grooves 40a delimiting the inner blocks 35 of the first circumferential row 38 and the first grooves 40a delimiting the inner blocks 35 of the second circumferential row 41 are parallel to each other.

Alternatively, according to an embodiment not shown, the first grooves 40a delimiting the inner blocks 35 of the first circumferential row 38 and the first grooves 40a delimiting the inner blocks 35 of the second circumferential row 41 symmetrically converge towards the circumferential groove 42 separating the first row 38 from the second row 41.

The possibility of providing grooves 40 all having the same inclination is not to be excluded.

Advantageously, the inner blocks 35 and shoulder blocks 34 have their longitudinal sides 35a, 34a, i.e. those sides substantially oriented in the circumferential direction X, inclined to the circumferential direction X itself by an angle $\alpha_7$ included between 1° and 5° so as to generate widened portions 45 in the circumferential grooves 39, 41 belonging to the second circumferential portion 3b and in the separating groove 26. The transverse grooves 40 delimiting the inner blocks 35 open into these widened portions 45. In addition, to increase amplitude of the widened portions 45, at least one of the corners of the inner blocks 35 facing said portion 45 is rounded off at 46 so as to offer more room for snow entrapping.

In accordance with the embodiment shown in FIG. 1, the transverse grooves 37 in the shoulder blocks 34 of the second circumferential portion 3b and the transverse grooves 7 of the shoulder blocks 5 of the first circumferential portion 3a are substantially parallel, to give origin to a tyre of the asymmetric and non-directional type.

Alternatively, according to a second embodiment shown in FIG. 4, the transverse grooves 37 of the shoulder blocks 34 of the second circumferential portion 3b and the transverse grooves 7 of the shoulder blocks 5 of the first circumferential portion 3a converge towards each other, to give origin to a tyre of the asymmetric-directional type.

In both the embodiments shown in FIGS. 1 and 4 the second circumferential portion 3b too is provided with a plurality of sipes 27 extending according to a sawtoothed profile and mutually connected by a plurality of notches 28 in the same manner as described for the first geometric module 4a. Sipes 27 of the second circumferential portion 3b have a depth included between 1.5 mm and 9.5 mm and a width not exceeding 1 mm.

In particular, each of the shoulder blocks 34 of the second circumferential portion 3b has a fifth series 47 of sipes 27 disposed substantially parallel to the transverse grooves 37 delimiting the shoulder blocks 34 themselves. The shoulder blocks 34 of the second circumferential portion 3b as well have circumferential sizes different from each other and are provided with three or four sipes 27 depending on their circumferential size.

In addition, advantageously, each of the inner blocks 35 of the first circumferential row 38 has a sixth series 48 of sipes 27 disposed parallel to each other and the extension of which is oblique to the axial direction Y and parallel to the first grooves 40a in the inner blocks 35 of the first circumferential row 38.

Preferably, as shown in FIGS. 1, 3 and 4, the first row 38 has inner blocks 35 with five sipes 27, and inner blocks 35 with four sipes 27.

The inner blocks 35 of the second circumferential row 41 each have a seventh series 49 of sipes 27 disposed parallel to each other and having an extension oblique to the axial direction Y and parallel to the first grooves 40a in the inner blocks 35 of the second circumferential row 41.

The second row 41 too has inner blocks 35 with five sipes 27, and inner blocks 35 with four sipes 27.

Finally, as can be viewed from FIGS. 1 and 4, the number of the shoulder blocks 34 of the second circumferential portion 3b is the same as the number of the inner blocks 35 of the first circumferential row 38 and as the number of the inner blocks 35 of the second circumferential row 41, and is twice the number of the elongated ridges 8 of the first circumferential portion 3a.

Figure 5:
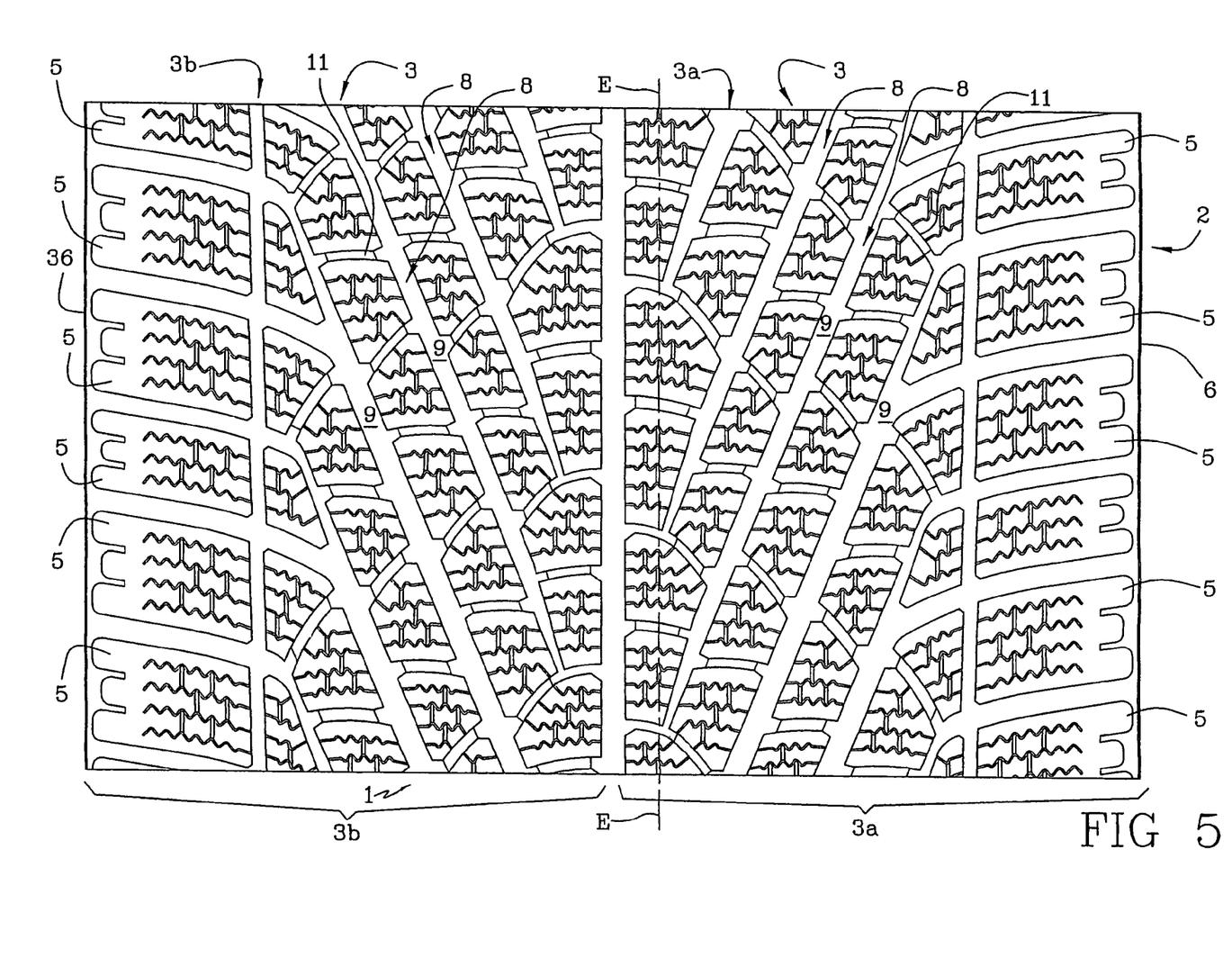
FIG. 5 shows a third embodiment of the tread band of FIG. 1.
Figure 6:
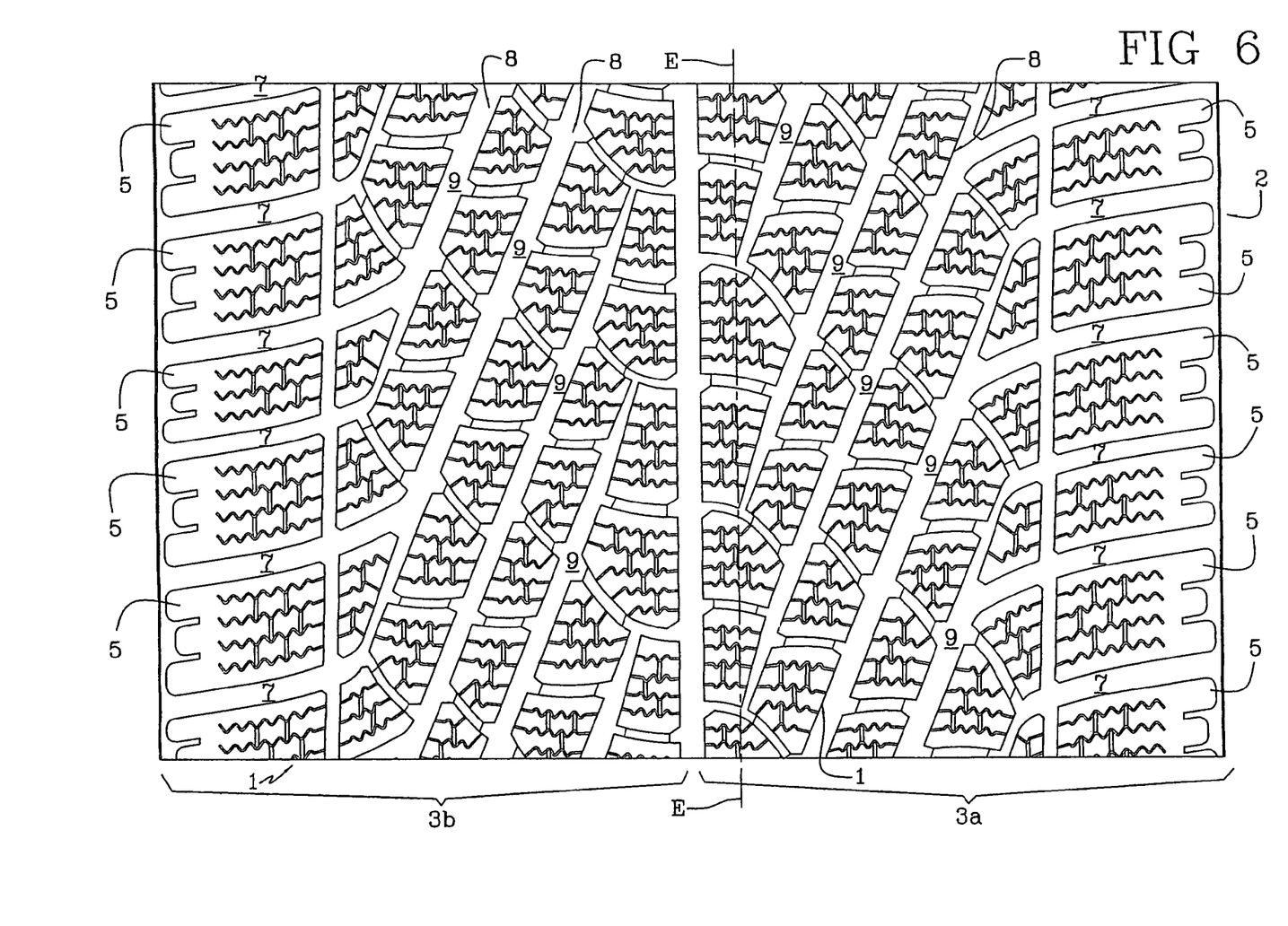
FIG. 6 shows a fourth embodiment of the tread band of FIG. 1.

In accordance with a third embodiment and a fourth embodiment, shown in FIGS. 5 and 6 respectively, the second geometric module 4b of the second circumferential portion 3b of the tread band pattern 2 is similar in structure to the geometric module 4a of the first portion 3a.

In particular, the second geometric module 4b too comprises at least two shoulder blocks 5 circumferentially aligned along a side edge 36 of the tread band 1 axially opposite to the side edge 6 belonging to the first geometric module 4a and bounded by grooves 7 oriented transversely to the circumferential tyre extension. The second geometric module 4b further comprises an elongated ridge 8 delimited by two oblique grooves 9 with respect to the circumferential extension direction X and divided into a plurality of blocks 10 disposed at an intermediate position in the axial extension of the tread band 1 and delimited by a plurality of cuts 11 substantially transverse to the elongated ridge 8.

In the third embodiment shown in FIG. 5, the oblique grooves 9 of the second geometric module 4b converge towards the oblique grooves 9 of the first geometric module 4a to form a tyre of the directional type. In the particular embodiment shown, the second geometric module 4b is symmetric with the first geometric module 4a with respect to the equatorial plane E of the tyre and is also circumferentially offset relative to the first geometric module itself.

In a fourth embodiment shown in FIG. 6, the oblique grooves 9 of the second geometric module 4b are substantially parallel to the oblique grooves 9 of the first geometric module 4a, to create a tyre of the symmetric type.

In the particular embodiment shown, the second geometric module 4b is identical to the first geometric module 4a, but rotated of 180° in the plane of the fugure and circumferentially offset relative to the first geometric module itself.

In further embodiments not shown the geometric modules 4a, 4b of the two circumferential portions 3a, 3b, while having the same structure, can advantageously have different sizes, particularly in relation to the length of the elongated ridges 8.

The present invention thus achieves the intended purposes.

The innovative expedients proposed by the invention, in fact, give rise to important improvements in terms of side grip of the tyre on roadways of reduced compactness, in particular on snow-covered surfaces, together with excellent qualities in terms of traction power and braking due in particular to the conformation of the first geometric module 4a adopted for the circumferential portion 3a shown in FIG. 1, and to the synergic co-operation with the second geometric module 4b.

In fact, due to the presence of cuts and grooves transverse to the axial direction, a remarkable surface for ground contact and snow accumulation is offered when the tyre is submitted to side forces. The presence of sawtoothed sipes also helps in achieving this result. Simultaneously, the transverse cuts and transverse grooves work, together with the cuts parallel to the axial direction, in order to supply traction power and grip on braking.

In addition, the oblique grooves ensure an efficient water ejection that helps in avoiding occurrence of the dangerous phenomenon known as "aquaplane".

It should be also understood that distribution of the blocks internal to the elongated ridges and of the shoulder blocks, as well as the inclination of same relative to the circumferential direction give rise to a noise spectrum distributed over a wide frequency band and of reduced intensity, thereby greatly reducing the rolling noise felt both internally and externally of the car. In fact, the number of points belonging to the edges of the blocks simultaneously coming into contact with the ground during rolling of the tyre is very reduced.

Simultaneously, the particular pattern of the first geometric module 4a at all events ensures a large contact surface between tyre and asphalt and consequently a performance level on dry roadways comparable with that ensured by a tread pattern expressly designed for such conditions.

Referring particularly to the embodiment of FIG. 1 and to the second embodiment of FIG. 2, differentiation of the two circumferential portions with the inner portion characterised by elongated ridges enables an optimised tyre for high performance cars with negative camber to be obtained. In fact, the two portions embody different features and, being applied simultaneously, ensure an optimal performance in all tests for tyre evaluation.

The outer portion works principally during changes of direction on snow-covered roadways, in particular on leaving a bend, since the snow bears against the shoulder blocks and inner blocks and is entrapped into the labyrinth path generated by them and into the greatly inclined sipes. The inner portion which, as already specified, represents the largest part of the footprint area, ensures a good behaviour on dry or wet roads as well.

Finally, distribution of the cuts and grooves following different inclinations over the whole extension of the tread band enables tendency of the tyre during rolling to rotate about an axis orthogonal to the rest surface to be minimised, which effect is known in the specific field as "torque steer".

In confirmation of the above mentioned advantages, two tables are reproduced hereinafter which relate to comparison tests between the tyre (P) of the present invention and three different tyres of the known art (Pr, P1, P2) having the same sizes 205/55 R16. Tyre Pr is a reference tyre produced by the Applicant and has the same structure and elastomer composition, in the different component elements thereof, of the inventive tyre. Tyres P1 and P2 are two reference tyres representing the two best tyres available from competitor firms and presently on the market.

The tyres were tested both on a snow-covered roadway and a dry road, using the same motor-vehicle and under the same environmental conditions. In particular, tests were conducted utilising a BMW 328i car (rear-wheel drive) and an Audi A3 1.8T car (front-wheel drive).

The values reproduced in the following tables represent a mean value between those obtained in several test sessions (5-6 tests, for example) using both the above mentioned cars.

In particular, tyres were submitted to instrument tests on traction, braking and slalom on a snow-covered roadway; to braking tests on a dry roadway; to noise tests; to aquaplane tests on a bend and on a straight stretch.

The above tyres were further submitted to subjective tests on traction, braking and handling on a snow-covered roadway; to handling tests on a dry and a wet roadway; and to noise tests, writing down the test drivers' subjective evaluations (expressed through a point system).

Table 1 refers to instrument tests, whereas Table 2 reproduces the test drivers' subjective evaluations.

The traction tests on a snow-covered roadway were conducted carrying out first-gear standing starts. With reference to Table 1, the maximum traction force of tyres P, P1, P2 was measured and expressed as a percentage of the maximum traction force of the reference tyre Pr.

Braking tests on a snow-covered roadway were carried out with deceleration from 50 to 5 km/h by using both the antilock braking system (ABS) and locked-wheel system.

Braking tests on dry asphalt were conducted with decelerations from 100 to 5 km/h by using the ABS system.

The average deceleration of tyres P, P1, P2 was measured and expressed as a percentage of the maximum deceleration of the reference tyre Pr.

The slalom test on a snow-covered roadway was conducted between ten traffic cones placed at a distance of eighteen meters from each other and at a speed included between 35 and 45 km/h; the maximum side acceleration of tyres P, P1, P2 during the slalom test was measured and expressed as a percentage of the maximum acceleration of the reference tyre Pr.

The aquaplane test on a straight stretch was carried out on a smooth asphalt stretch (100 m long, for example) covered with a water layer of constant depth (7 mm). The water layer was restored after each passage so as to ensure the same conditions during each test. The test was conducted by making the vehicle to enter the asphalt stretch at a constant speed (70 km/h, for example) under optimal grip conditions and by progressively accelerating the vehicle until reaching conditions of complete grip loss. During the test the speed at which all wheels lose grip was measured and this speed was expressed as a percentage of the maximum speed of the reference tyre Pr.

The aquaplane test on a bend was carried out on a curvilinear path of constant radius (of 100 m) the final stretch of which (over a portion 20 m long, for example) was covered with a water layer of constant depth (7 mm deep). The test was conducted at a constant speed and repeated for different speed values. The maximum speed and maximum acceleration of the car on the bend were measured before grip loss and these values were expressed as a percentage of the maximum speed and maximum acceleration of the reference tyre Pr.

The outdoor noise test (the term "outdoor" being used to distinguish it from the indoor noise test carried out in a semi-anechoic chamber) was conducted in order to evaluate both the internal noise of the car and the external noise of same.

In order to evaluate the internal noise of the car, the test consisted in driving the car at a predetermined constant speed and subsequently making the car to run a straight stretch with a switched-off engine and in neutral (this test is called "coast by noise"). The test is repeated driving the car at different speeds. When cars were run on this straight stretch with a switched-off engine and in neutral, the internal noise of the car was instrumentally measured by use of a so-called "acoustic head" simulating the driver/passenger position within the car by means of microphones positioned at the ear height. The test further consisted in a subjective evaluation (expressed through a point system) carried out by the test driver having the task of evaluating the noise level perceived within the car.

This test was further conducted making the car to travel over said straight stretch at constant speed, without switching the engine off. In addition, this test was repeated on different asphalt typologies.

In order to evaluate the noise external to the car, the test consisted in causing the car to run over a straight stretch provided with microphones disposed on opposite sides of said stretch.

The test was conducted following two different modalities: a) imposing an acceleration to the car while said car was covering the above mentioned stretch (this test is called "pass by noise"); b) bringing the vehicle to a constant speed, by switching the engine off and putting it in neutral at the above mentioned straight stretch.

The handling tests were conducted on a track and the test driver simulated some characteristic manoeuvring (change of lane, entering a bend, leaving a bend, for example) carried out at constant speed, in acceleration and in deceleration. Then test driver judged the tyre behaviour and assigned a score depending on the tyre performance during said manoeuvring.

The average scores given by several test drivers to the different performance tests taken into account are reproduced in Table 2.

In the tables it is possible to see that the tyre of the present invention has higher scores than the tyres of the known art.

The values reproduced in the tables are expressed in relation to the value of 100 given to the reference tyre Pr.

TABLE 1

Instrument tests

|  | P | Pr | P1 | P2 |
|---|---|---|---|---|
| Traction on snow | 105 | 100 | 101 | 98 |
| Braking on snow | 102 | 100 | 98 | 100 |
| Slalom on snow | 106 | 100 | 100 | 97 |
| Braking on dry asphalt | 101 | 100 | 101 | 100 |
| Aquaplane on a bend | 104 | 100 | 101 | 98 |
| Aquaplane in straight stretch | 103 | 100 | 102 | 97 |
| Outdoor noise (internal noise) | 107 | 100 | 95 | 98 |
| Outdoor noise (external noise) | 105 | 100 | 98 | 100 |

TABLE 2

| | Subjective tests | | | |
|---|---|---|---|---|
| | P | Pr | P1 | P2 |
| Traction on snow | 108 | 100 | 101 | 99 |
| Braking on snow | 103 | 100 | 98 | 101 |
| Handling on snow | 108 | 100 | 102 | 102 |
| Handling on a dry roadway | 105 | 100 | 98 | 100 |
| Handling on a wet roadway | 105 | 100 | 99 | 98 |
| Outdoor noise on smooth/coarse asphalt | 108 | 100 | 96 | 99 |

The invention claimed is:

1. A tyre for a vehicle wheel, comprising:
a tread band;
wherein the tread band comprises a tread-band pattern,
wherein the tread-band pattern comprises:
   at least two circumferential portions, at least one of the circumferential portions comprising a first geometric module, wherein the first geometric module comprises:
      an elongated ridge; and
      at least two shoulder blocks;
wherein the at least two circumferential portions are disposed in axial side-by-side relationship;
wherein the first geometric module is repeated along a circumferential extension direction of the tyre,
wherein the elongated ridge is bounded by two grooves oblique to the circumferential extension direction,
wherein the elongated ridge is divided into a plurality of intermediate blocks with respect to an axial extension direction of the tread band,
wherein the intermediate blocks are bounded by a plurality of cuts substantially transverse to the elongated ridge;
wherein the at least two shoulder blocks are associated with the elongated ridge,
wherein the at least two shoulder blocks are circumferentially aligned along a side edge of the tread band,
wherein the at least two shoulder blocks are bounded by grooves oriented substantially transversely to the circumferential extension direction,
wherein at least one circumferential shoulder groove separates the elongated ridge from the at least two shoulder blocks,
wherein each intermediate block defines a substantially trapezoidal shape,
wherein the plurality of cuts comprises first and second cuts,
wherein the first cuts are substantially perpendicular to the circumferential extension direction, and
wherein the second cuts are substantially perpendicular to the oblique grooves.

2. The tyre of claim 1, further comprising:
at least one circumferential groove separating the at least two circumferential portions.

3. The tyre of claim 2, wherein the at least one circumferential groove separating the at least two circumferential portions is spaced apart from an equatorial plane of the tyre.

4. The tyre of claim 1, wherein the oblique grooves have an inclination included between 15° and 35° relative to the circumferential extension direction.

5. The tyre of claim 1, wherein the substantially transverse grooves have an inclination included between 75° and 105° relative to the circumferential extension direction.

6. The tyre of claim 1, wherein the elongated ridge comprises a swollen axially internal end, comprising:
at least two center blocks circumferentially aligned with each other.

7. The tyre of claim 6, wherein each center block comprises a substantially trapezoidal shape.

8. The tyre of claim 6, wherein the center blocks are bounded by substantially transverse cuts converging into a circumferential separating groove interposed between the at least two circumferential portions.

9. The tyre of claim 6, wherein each center block comprises:
a third series of sipes;
wherein the sipes of the third series comprise a sawtoothed profile, and
wherein the sipes of the third series are disposed parallel to each other in a mainly axial extension.

10. The tyre of claim 1, wherein the at least two shoulder blocks comprise a same circumferential size.

11. The tyre of claim 1, wherein the at least two shoulder blocks comprise different circumferential sizes.

12. The tyre of claim 1, wherein the at least two shoulder blocks associated with a first elongated ridge comprise different circumferential sizes than the at least two shoulder blocks associated with a second elongated ridge circumferentially adjacent to the first elongated ridge.

13. The tyre of claim 1, wherein the elongated ridge comprises:
an axially external end;
wherein the axially external end is substantially in axial alignment with one of the at least two shoulder blocks.

14. The tyre of claim 13, wherein the axially external end comprises:
an end block;
wherein the end block comprises a substantially trapezoidal shape.

15. The tyre of claim 13, wherein the first geometric module comprises:
an auxiliary block disposed circumferentially close to the axially external end.

16. The tyre of claim 15, wherein the auxiliary block is substantially in axial alignment with one of the at least two shoulder blocks.

17. The tyre of claim 16, wherein the shoulder block substantially in axial alignment with the axially external end comprises a circumferential size greater than a circumferential size of the shoulder block substantially in axial alignment with the auxiliary block.

18. The tyre of claim 16, wherein the shoulder block substantially in axial alignment with the axially external end comprises a circumferential size smaller than a circumferential size of the shoulder block substantially in axial alignment with the auxiliary block.

19. The tyre of claim 15, wherein the auxiliary block is bounded by first and second branches of one of the oblique grooves, and
wherein each branch opens into one of the substantially transverse grooves.

20. The tyre of claim 19, wherein each of the first and second branches is substantially in alignment with one of the substantially transverse grooves.

21. The tyre of claim 15, wherein the auxiliary block comprises a substantially trapezoidal shape.

22. The tyre of claim 13, wherein the axially external end comprises:
an end block;

wherein the end block comprises a substantially trapezoidal shape,
wherein the first geometric module comprises:
an auxiliary block disposed circumferentially close to the axially external end;
wherein each end block and each auxiliary block comprises:
a fourth series of sipes;
wherein the sipes of the fourth series comprise a sawtoothed profile, and
wherein the sipes of the fourth series are disposed parallel to each other according to an extension substantially parallel to the substantially transverse grooves.

23. The tyre of claim 1, wherein the first and second cuts are disposed in an alternating sequence along a major extension direction of the elongated ridge.

24. The tyre of claim 1, wherein the tread-band pattern further comprises:
a plurality of sipes.

25. The tyre of claim 24, wherein the sipes are formed on the first geometric module in a mainly axial extension.

26. The tyre of claim 24, wherein each sipe comprises a sawtoothed profile.

27. The tyre of claim 24, wherein the tread-band pattern further comprises:
a plurality of connecting notches between the sipes.

28. The tyre of claim 1, wherein each shoulder block comprises:
a first series of sipes;
wherein the sipes of the first series comprise a sawtoothed profile, and
wherein the sipes of the first series are disposed parallel to each other according to an extension substantially parallel to the substantially transverse grooves.

29. The tyre of claim 1, wherein each intermediate block comprises:
a second series of sipes;
wherein the sipes of the second series comprise a sawtoothed profile, and
wherein the sipes of the second series are disposed parallel to each other in a mainly axial extension.

30. The tyre of claim 1, wherein the oblique grooves each run in an extension of one of the substantially transverse grooves.

31. The tyre of claim 1, wherein the tread-band pattern further comprises:
a second circumferential portion;
wherein the second circumferential portion comprises a second geometric module repeated along the circumferential extension direction,
wherein the second geometric module comprises:
a second elongated ridge; and
at least two second shoulder blocks;
wherein the second elongated ridge is bounded by two second grooves oblique to the circumferential extension direction,
wherein the second elongated ridge is divided into a plurality of second intermediate blocks with respect to the axial extension direction,
wherein the second intermediate blocks are bounded by a plurality of second cuts substantially transverse to the second elongated ridge;
wherein the at least two second shoulder blocks are associated with the second elongated ridge,
wherein the at least two second shoulder blocks are circumferentially aligned along a second side edge of the tread band, and
wherein the at least two second shoulder blocks are bounded by second grooves oriented substantially transversely to the circumferential extension direction.

32. The tyre of claim 31, wherein the second oblique grooves converge towards the oblique grooves of the first geometric module.

33. The tyre of claim 31, wherein the second oblique grooves are substantially parallel to the oblique grooves of the first geometric module.

34. The tyre of claim 31, wherein the first geometric module is circumferentially offset relative to the second geometric module.

35. The tyre of claim 1, wherein the tread-band pattern comprises a second circumferential portion, comprising:
a plurality of third shoulder blocks; and
a plurality of inner blocks;
wherein the third shoulder blocks are circumferentially aligned along a second side edge of the tread band,
wherein the third shoulder blocks are bounded by third grooves oriented substantially transversely to the circumferential extension direction,
wherein the plurality of inner blocks are distributed along at least one circumferential row separated from the third shoulder blocks by a second circumferential shoulder groove, and
wherein the inner blocks are bounded by fourth grooves oriented substantially transversely to the circumferential extension direction.

36. The tyre of claim 35, wherein the second circumferential portion of the tread-band pattern further comprises:
a first circumferential row of inner blocks; and
a second circumferential row of inner blocks;
wherein the first circumferential row of inner blocks is disposed in axial side-by-side relationship with the second circumferential row of inner blocks, and
wherein the first circumferential row of inner blocks is separated from the second circumferential row of inner blocks by a second circumferential groove.

37. The tyre of claim 36, wherein the fourth substantially transverse grooves bounding the inner blocks of the first circumferential row are circumferentially offset relative to the fourth substantially transverse grooves bounding the inner blocks of the second circumferential row, and
wherein the fourth substantially transverse grooves bounding the inner blocks of the first circumferential row are circumferentially offset relative to the third substantially transverse grooves.

38. The tyre of claim 36, wherein the fourth substantially transverse grooves comprise:
fifth grooves inclined to the axial extension direction; and
sixth grooves substantially perpendicular to the circumferential extension direction.

39. The tyre of claim 38, wherein the fifth grooves are inclined to the axial extension direction by an angle included between 25° and 55°.

40. The tyre of claim 38, wherein the sixth grooves are inclined to the axial extension direction by an angle included between 5° and 20°.

41. The tyre of claim 38, wherein the fifth and sixth grooves are disposed in an alternating sequence along a respective circumferential row.

42. The tyre of claim 38, wherein the fifth grooves bounding the inner blocks of the first circumferential row are parallel to the fifth grooves bounding the inner blocks of the second circumferential row.

43. The tyre of claim 38, wherein each inner block of the second circumferential row comprises:

a seventh series of sipes;
wherein the sipes of the seventh series comprise a sawtoothed profile, and
wherein the sipes of the seventh series are disposed parallel to each other according to an extension oblique to the axial extension direction.

44. The tyre of claim 43, wherein the sipes of the seventh series extend substantially parallel to the fifth grooves.

45. The tyre of claim 36, wherein the fourth substantially transverse grooves comprise:
fifth grooves inclined to the axial extension direction; and
sixth grooves substantially perpendicular to the circumferential extension direction.
wherein each inner block of the first circumferential row comprises:
a sixth series of sipes;
wherein the sipes of the sixth series comprise a sawtoothed profile, and
wherein the sipes of the sixth series are disposed parallel to each other according to an extension oblique to the axial extension direction.

46. The tyre of claim 45, wherein the sipes of the sixth series extend substantially parallel to the fifth grooves.

47. The tyre of claim 36, wherein a number of the shoulder blocks of the second circumferential portion is the same as a number of the inner blocks of the first circumferential row,
wherein the number of the shoulder blocks of the second circumferential portion is the same as a number of the inner blocks of the second circumferential row, and
wherein the number of the shoulder blocks of the second circumferential portion is twice a number of elongated ridges of a first circumferential portion.

48. The tyre of claim 35, wherein the third substantially transverse grooves are circumferentially offset relative to the fourth substantially transverse grooves.

49. The tyre of claim 35, wherein the inner blocks comprise a substantially trapezoidal shape.

50. The tyre of claim 35, wherein the inner blocks comprise longitudinal sides inclined to the circumferential extension direction.

51. The tyre of claim 50, wherein the longitudinal sides are inclined to the circumferential extension direction by an angle included between 1° and 5°.

52. The tyre of claim 35, wherein the third substantially transverse grooves are inclined to the circumferential extension direction by an angle included between 75° and 105°.

53. The tyre of claim 35, wherein the third substantially transverse grooves of the second circumferential portion and the substantially transverse grooves of the at least two shoulder blocks of the first circumferential portion converge towards each other.

54. The tyre of claim 35, wherein the third substantially transverse grooves of the second circumferential portion are substantially parallel to the substantially transverse grooves of the at least two shoulder blocks of the first circumferential portion.

55. The tyre of claim 35, wherein the third shoulder blocks comprise different circumferential sizes.

56. The tyre of claim 35, wherein each third shoulder block comprises:
a fifth series of sipes;
wherein the sipes of the fifth series comprise a sawtoothed profile, and
wherein the sipes of the fifth series are disposed according to an extension substantially parallel to the third substantially transverse grooves.

* * * * *